(12) United States Patent
Ricciuti et al.

(10) Patent No.: US 9,306,376 B2
(45) Date of Patent: Apr. 5, 2016

(54) SWITCHGEAR SYSTEM AND ELECTRICAL SWITCHING APPARATUS ASSEMBLY THEREFOR

(71) Applicant: EATON CORPORATION, Cleveland, OH (US)

(72) Inventors: Anthony Thomas Ricciuti, Bethel Park, PA (US); Daniel Garett Sims, Newberry, SC (US)

(73) Assignee: EATON CORPORATION, Cleveland, OH (US)

( * ) Notice: Subject to any disclaimer, the term of this patent is extended or adjusted under 35 U.S.C. 154(b) by 44 days.

(21) Appl. No.: 14/463,969

(22) Filed: Aug. 20, 2014

(65) Prior Publication Data
US 2016/0056618 A1 Feb. 25, 2016

(51) Int. Cl.
*H02B 1/14* (2006.01)
*H02B 11/133* (2006.01)
*H01H 9/22* (2006.01)

(52) U.S. Cl.
CPC .............. *H02B 11/133* (2013.01); *H01H 9/22* (2013.01)

(58) Field of Classification Search
USPC ............................. 361/605–606; 218/155–157
See application file for complete search history.

(56) References Cited

U.S. PATENT DOCUMENTS

| 2,302,395 | A | * | 11/1942 | Seaman | H02B 1/56 174/16.1 |
| 2,472,961 | A | * | 6/1949 | Scott, Jr. | H01H 71/0207 200/293 |
| 3,612,799 | A | * | 10/1971 | Carter | H01H 33/82 218/51 |
| 3,662,133 | A | * | 5/1972 | Bould | H02B 11/173 218/151 |
| 6,561,604 | B2 | | 5/2003 | Leccia et al. | |
| 7,440,259 | B1 | * | 10/2008 | Deylitz | H02B 11/24 200/50.21 |
| 8,420,964 | B2 | | 4/2013 | Pearce et al. | |
| 8,644,007 | B2 | | 2/2014 | Pearce et al. | |

* cited by examiner

*Primary Examiner* — Gregory Thompson
(74) *Attorney, Agent, or Firm* — Eckert Seamans Cherin & Mellott, LLC; Grant E. Coffield

(57) ABSTRACT

An electrical switching apparatus assembly is for a switchgear system. The switchgear system include an enclosure and a plurality of electrical bus members. The enclosure includes a number of compartments and a gas barrier having a plurality of thru holes. The electrical switching apparatus assembly includes an electrical switching apparatus, movable between a connection position and a disconnected position, and a pin assembly. The housing of the electrical switching apparatus includes a cover member having a plurality of apertures. The pin assembly includes a plurality of pins. When the electrical switching apparatus is disposed in the connected position, the apertures of the cover member align with the thru holes of the gas barrier to receive the pins and secure the electrical switching apparatus to the enclosure.

20 Claims, 3 Drawing Sheets

SWITCHGEAR SYSTEM AND ELECTRICAL SWITCHING APPARATUS ASSEMBLY THEREFOR

BACKGROUND

1. Field

The disclosed concept relates generally to electrical systems and, more particularly, to electrical systems such as, for example, switchgear systems. The disclosed concept also relates to electrical switching apparatus assemblies for switchgear systems.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of a corresponding compartment or cell of the switchgear enclosure. Accordingly, such circuit breakers are commonly known in the art as "draw-out" circuit breakers. The draw-out circuit breaker can be drawn (e.g., racked) into and out of a connected position wherein the primary disconnect contacts of each circuit breaker pole engage with the mating stabs at the rear of the cell. Racking into the connected position is typically accomplished with a manually or electrically rotated jackscrew, worm gear, or other known or suitable mechanism.

ANSI rated medium voltage draw-out circuit breakers are designed to withstand predetermined short circuit currents for predetermined durations. Short circuit testing is conducted with the electrical power contained within the prescribed electrical current paths. Arc resistant medium voltage draw-out circuit breakers must pass more rigorous testing where an electrical arc is artificially initiated between the circuit breaker phases, outside of the prescribed electrical current paths. The resulting explosion of superheated gasses and vaporized components must be managed in such a way as to maintain the arc and the circuit breaker within the switchgear enclosure while the rapidly expanding pressure is directed and expelled in a controlled manner.

Typically, the circuit breaker is latched within the corresponding compartment or cell of the switchgear enclosure via spring-loaded retaining pins extending laterally outwardly from the opposing sides of the circuit breaker to engage corresponding slots in the opposing side walls of the switchgear enclosure compartment or cell. This system is sufficiently robust to withstand standard switchgear ratings. However, the high pressure explosion associated with arc resistant circuit breakers testing causes the side walls of the switchgear enclosure compartment or cell to react by expanding (e.g., bending away). Such expansion can displace the slots in the compartment causing them to unintentionally release the retaining pins. Thus, the potential exists for the circuit breaker to be ejected from the switchgear enclosure compartment.

There is, therefore, room for improvement in switchgear systems and in electrical switching apparatus assemblies therefor.

SUMMARY

These needs and others are met by embodiments of the disclosed concept, which are directed to an electrical switching apparatus assembly for a switchgear system.

As one aspect of the disclosed concept, an electrical switching apparatus assembly is provided for a switchgear system. The switchgear system includes an enclosure and a plurality of electrical bus members. The enclosure comprises a number of compartments and a gas barrier having a plurality of thru holes. The electrical switching apparatus assembly comprises: an electrical switching apparatus having a plurality of poles and a housing, the housing including a cover member having a plurality of apertures; and a pin assembly comprising a plurality of pins structured to extend through the apertures and the thru holes to secure the electrical switching apparatus to the enclosure.

The electrical switching apparatus may be structured to move between a connected position corresponding to the electrical switching apparatus being disposed within a corresponding one of the compartments with the poles being electrically connected to the electrical bus members, and a disconnected position corresponding to the poles being electrically disconnected and spaced from the electrical bus members. When the electrical switching apparatus is disposed in the connected position, each of the apertures of the cover member may be structured to align with a corresponding one of the thru holes of the gas barrier in order to receive a corresponding one of the pins.

Each of the pins may comprise an insertion end, an enlarged head, and an elongated body portion extending between the insertion end and the enlarged head. The cover member may have a first side and a second side disposed opposite the first side. When the electrical switching apparatus is disposed in the connected position, the second side may be structured to engage and overlap a portion of the gas barrier. When the pins are installed, the elongated body may be structured to extend through a corresponding one of the apertures and a corresponding one of the thru holes, and the enlarged head may be disposed on them first side of the cover member.

As another aspect of the disclosed concept, a switchgear system comprises: an enclosure comprising a number of compartments and a gas barrier, the gas barrier having a plurality of thru holes; a plurality of electrical bus members; and an electrical switching apparatus assembly comprising: an electrical switching apparatus having a plurality of poles and a housing, the housing including a cover member having a plurality of apertures, and a pin assembly comprising a plurality of pins structured to extend through the apertures and the thru holes to secure the electrical switching apparatus to the enclosure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
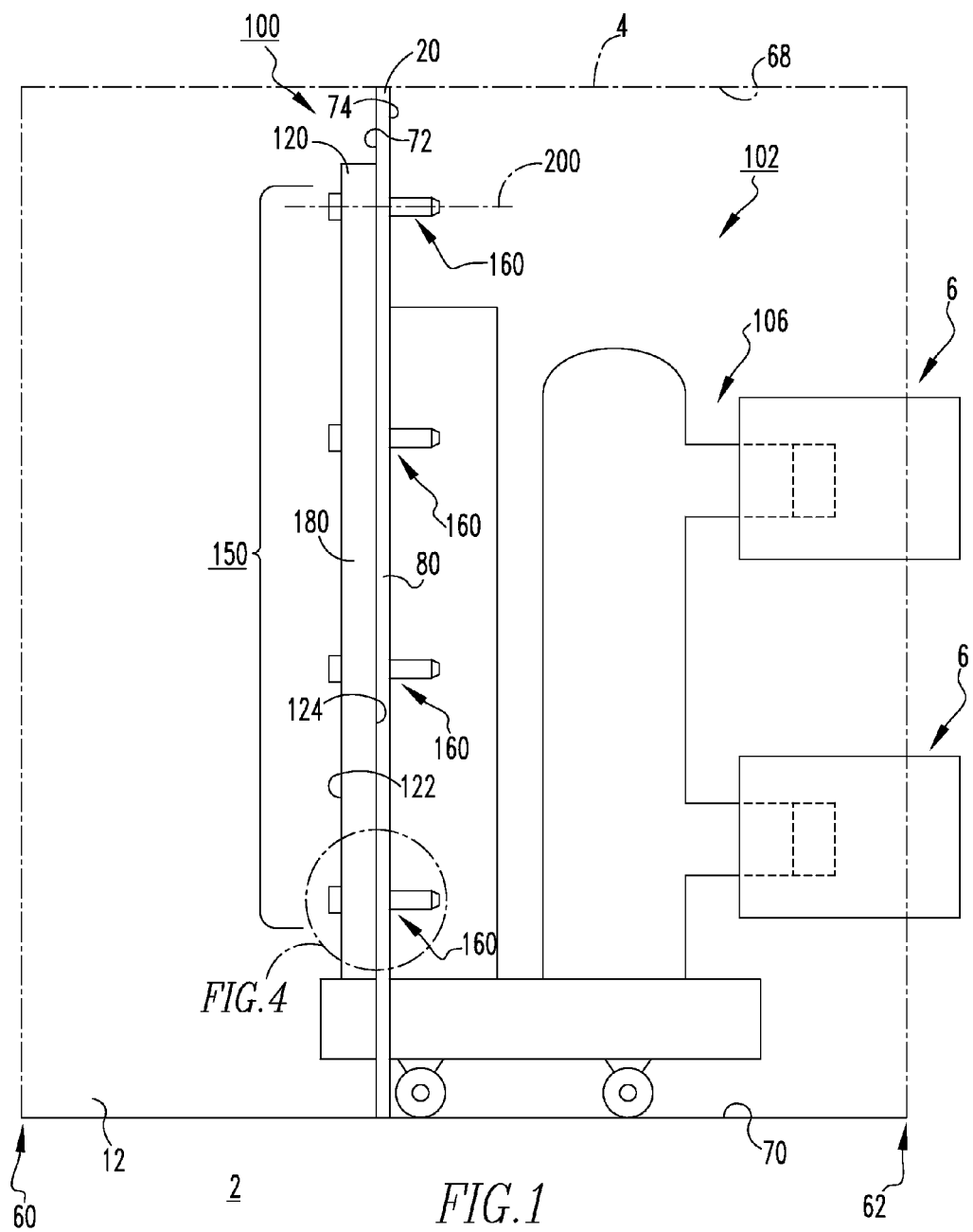
FIG. 1 is a side elevation view of a switchgear system and electrical switching apparatus assembly therefor, in accordance with an embodiment of the disclosed concept.

Directional phrases used herein, such as, for example, upper, lower and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
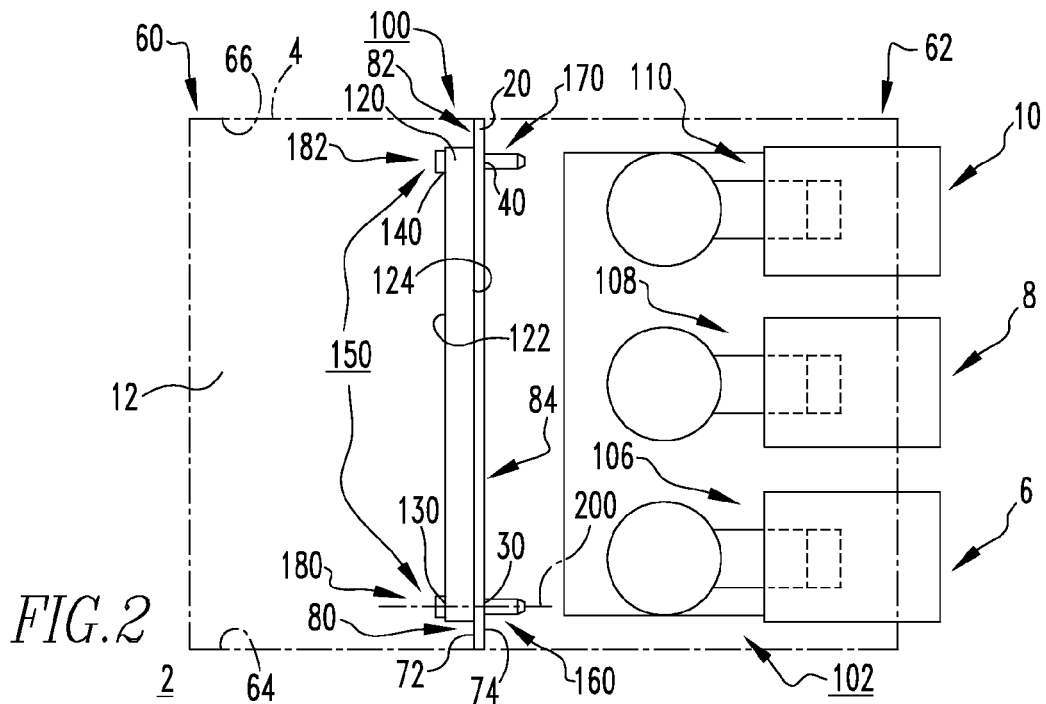
FIG. 2 is a top plan view of the switchgear system and electrical switching apparatus assembly therefor of FIG. 1.
Figure 3:
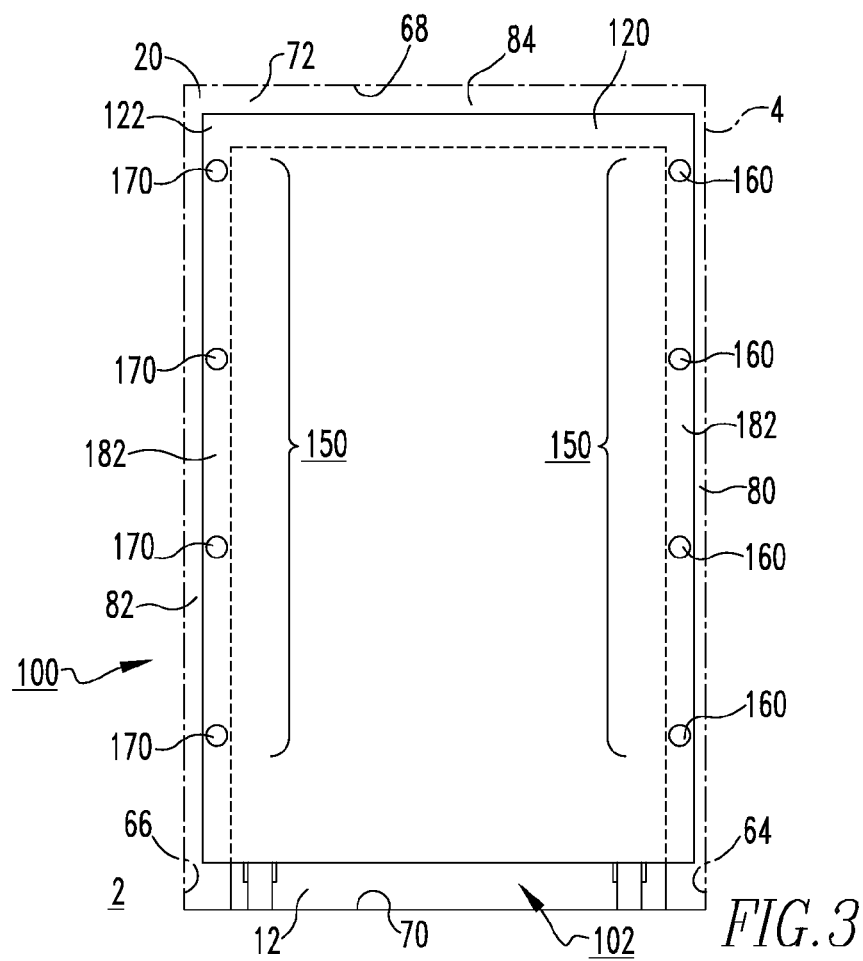
FIG. 3 is a front end elevation view of the switchgear system and electrical switching apparatus assembly therefor of FIG. 2.

FIGS. 1-3 show an electrical switching apparatus assembly 100 for a switchgear system 2, in accordance with one non-limiting example embodiment of the disclosed concept. The switchgear system 2 includes an enclosure 4 and a plurality of electrical bus members 6,8,10 (all shown in simplified form in FIG. 2). The enclosure 4 has a number of compartments 12 (one is shown) and a gas barrier 20. The gas barrier 20 extends into the compartment 12 and includes a plurality of thru holes 30,40 (FIGS. 2, 4 and 5).

The electrical switching apparatus assembly 100 includes an electrical switching apparatus such as, for example and without limitation, the draw-out circuit breaker 102, shown. In the example shown and described herein, the draw-out circuit breaker 102 includes a housing 104, and has three poles 106,108,110. It will be appreciated, however, that the disclosed concept could be employed with any known or suitable alternative type of electrical switching apparatus (not shown) having any known or suitable number of poles (not shown).

Figure 4:
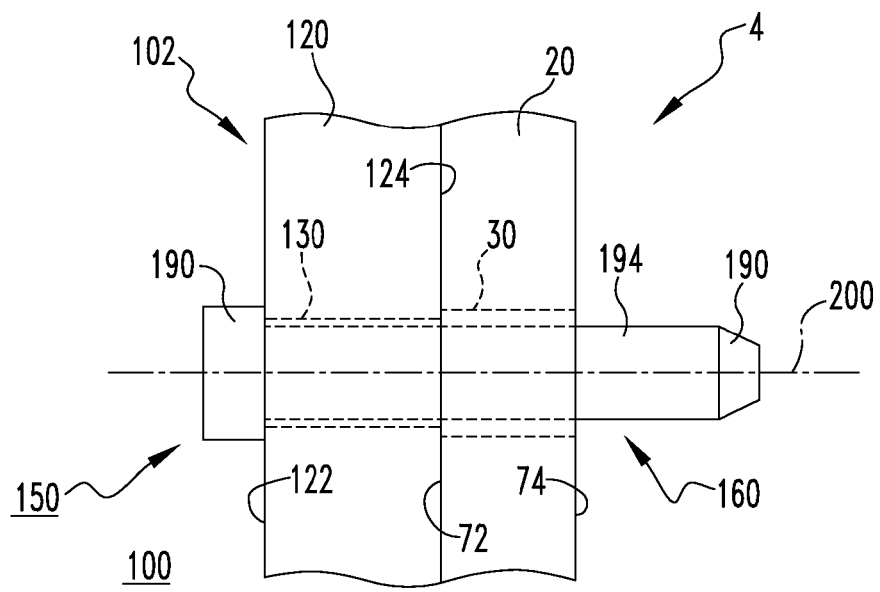
FIG. 4 is an enlarged view of a portion of the electrical switching apparatus assembly of FIG. 1.
Figure 5:
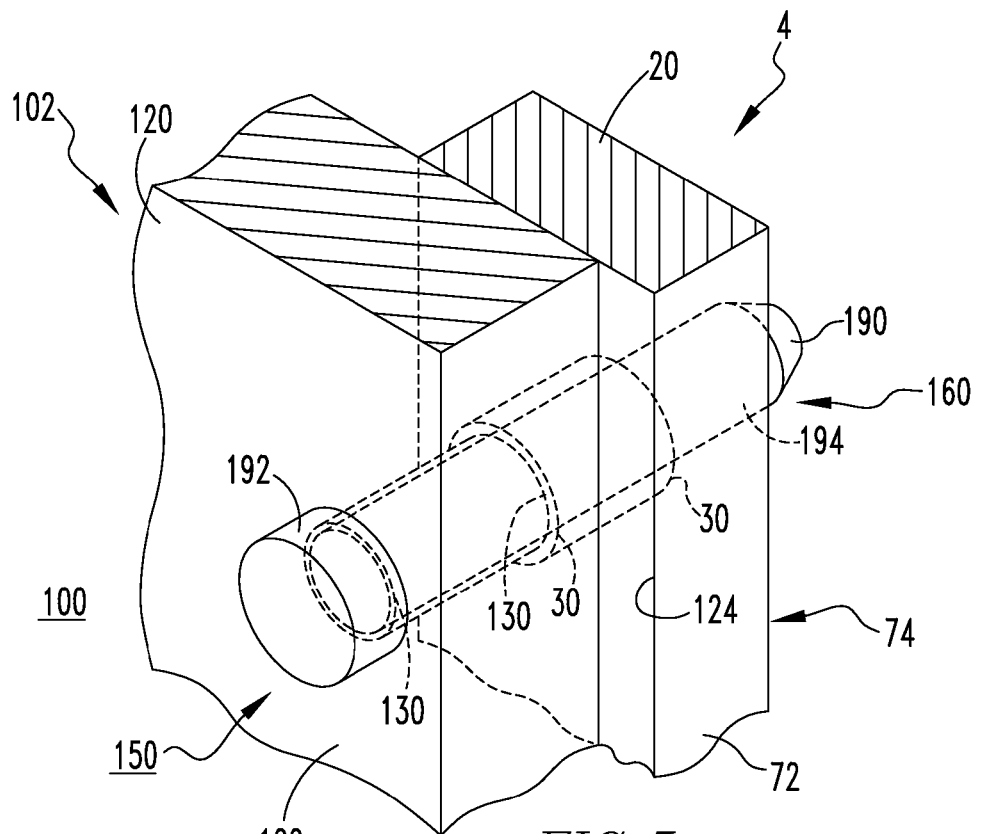
FIG. 5 is an isometric view of the portion of the electrical switching apparatus assembly of FIG. 4.

The circuit breaker housing 104 includes a cover member 120, which has a plurality of apertures 130,140 (FIGS. 2, 4 and 5). The electrical switching apparatus assembly 100 further includes a pin assembly 150 having a plurality of pins 160,170 (all shown in FIG. 3), which are structured to extend through the apertures 130,140 and the corresponding aligned thru holes 30,40 to secure the draw-out circuit breaker 102 to the enclosure 4. In other words, the disclosed electrical switching apparatus assembly 100 establishes the draw-out circuit breaker 102 as a structural member of the switchgear enclosure 4 through the cooperation of the pins 160,170 of the pin assembly 150 securing the cover member 120, and thus the circuit breaker 102, to the switchgear enclosure 4. Accordingly, disadvantages associated with prior art designs are addressed and overcome, such as expansion of the switchgear enclosure sidewalls and unintended release of the fastening mechanisms (not shown) in response to the high pressure explosion of arc resistant switchgear testing, causing the circuit breaker to be undesirably ejected from the switchgear enclosure compartment. That is, in accordance with the disclosed electrical switching apparatus assembly 100, the sidewalls (see, for example and without limitation, first and second sidewalls 64,66 of FIG. 2) are constrained against such expansion or bending.

Continuing to refer to FIGS. 1-3, it will be appreciated that the example draw-out circuit breaker 102 is structured to move between the connected position, shown, in which the circuit breaker 102 is disposed within the corresponding compartment 12 of the switchgear enclosure 4 with the poles 106,108,110 being electrically connected to the electrical bus members 6,8,10 (all shown in FIG. 2), and a disconnected position (not shown) corresponding to the poles 106,108,110 being electrically disconnected and spaced from the electrical bus members 6,8,10. When the circuit breaker 102 is disposed in the connected position, each of the aforementioned apertures 130,140 of the cover member 120 aligns with a corresponding one of the thru holes 30,40 of the gas barrier 20 and receives a corresponding one the pins 160,170.

The switchgear enclosure compartment 12 further includes first and second opposing ends 60,62, a first sidewall 64, second sidewall 66 disposed opposite and parallel to the first sidewall 64, and upper wall 68, and a lower wall 70 disposed opposite and parallel to the upper wall 68. The electrical bus members 6,8,10 are disposed at or about the second end 62 of the compartment 12. The gas barrier 20 extends inwardly from at least one of the first sidewall 64, second sidewall 66, upper wall 68 and lower wall 70, in order to form a "picture frame" barrier, as best shown in FIG. 3 and as described in greater detail hereinbelow. Such gas barrier 20 is disposed between the first end 60 and the second end 62, as best shown in the side elevation and top elevation views of FIGS. 1 and 2, respectively. When the circuit breaker 102 is disposed in the connected position, the cover member 120 at least partially overlays the gas barrier 20, as shown.

The gas barrier 20 includes first and second opposing sides 72,74. The first side 72 faces the first end 60 of the switchgear enclosure compartment 12, and the second side 74 faces the second end 62. When the circuit breaker 102 is disposed in the connected position, the cover member 120 is disposed on the first side 72 of the gas barrier 20, while the remainder of the circuit breaker 102 is substantially disposed on the second side 74 of the gas barrier 20, as best shown in FIGS. 1 and 2.

As best shown in the front elevation view of FIG. 3, the gas barrier 20 includes a first segment 80 extending perpendicularly inwardly from the first sidewall 64 of the switchgear enclosure 4, a second segment 82 extending perpendicularly inwardly from the second sidewall 66 opposite the first segment 80, and a third segment 84 extending perpendicularly inwardly from the upper wall 68. The first and second segments 80,82 extend between the upper wall 68 and the lower wall 70. The third segment 84 extends between the first and second segments 80,82. The cover member 120 overlaps at least a portion of the first segment 80, the second segment 82, and the third segment 84, as shown.

Continuing to refer to FIG. 3, in the example shown, each of the first and second segments 80,82 of the gas barrier 20 respectively include four thru holes 30,40, the cover member 120 includes first and second edge portions 180,182 having four apertures 130,140, respectively, and the pin assembly 150 includes four first pins 160 and four second pins 170. In operation, when the draw-out circuit breaker 102 is disposed in the connected position, each of the first apertures 130 aligns with a corresponding one of the thru holes 30 to receive a corresponding one of the pins 160, and each of the apertures 140 aligns with a corresponding one of the thru holes 40 to receive a corresponding one of the pins 170. In this manner, the pin assembly 150 secures the circuit breaker 102 and, in particular, the cover member 120 to the switchgear enclosure 4 and, in particular, the gas barrier 20 thereof. It will be appreciated, however, that any known or suitable alternative number and/or configuration of apertures, thru holes and pins (not shown) could be employed, without departing from the scope of the disclosed concept.

Referring to FIGS. 1, 2 and 4, the pins 160,170 of the pin assembly 150, will now be described in greater detail. For ease of illustration and economy of disclosure, only one pin 160 will be described, in detail. It will be appreciated, however, that all of the pins 160,170 of the pin assembly 150 are preferably substantially identical. Each pin 160 has a longitudinal axis 200, and is structured to extend substantially horizontally from the cover member 120 toward the second end 62 of the corresponding compartment 12 of the switchgear enclosure 4, with the longitudinal axis 200 being substantially parallel with respect to the first sidewall 64, the second sidewall 66, the upper wall 68 and the lower wall 70.

Each pin 160 further includes an insertion end 190, an enlarged head 192 and an elongated body portion 194 extending between the insertion end 190 and the enlarged head 192. As shown in FIGS. 4 and 5, the cover member 120 of the circuit breaker 102 (FIGS. 1-3) has a first side 122 and a second side 124 disposed opposite the first side 122. When the circuit breaker 102 is disposed in the connected position, as shown in FIGS. 1 and 2, the second side 124 engages and overlaps a portion of the gas barrier 20. When the pins 160, 170 (one pin 160 is shown in FIGS. 4 and 5) are installed, the elongated body 194 of the pin 160 extends through corresponding aperture 130 and corresponding thru hole 30, as previously discussed, and the enlarged head 192 of the pin 160 is disposed on the first side 122 of the cover member 120, as shown.

Accordingly, the disclosed electrical switching apparatus assembly 100 provides a unique mechanism for establishing the circuit breaker 102 as a structural member of the switchgear enclosure 4. In this manner, among other advantages, the disclosed concept provides a safety mechanism that overcomes known disadvantages (e.g., without limitation, ejection of the circuit breaker from the compartment due to the high pressure explosion associated with arc resistant switchgear testing) associated with prior art designs.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus assembly for a switchgear system comprising an enclosure and a plurality of electrical bus members, said enclosure comprising a number of compartments and a gas barrier having a plurality of thru holes, said electrical switching apparatus assembly comprising:
   an electrical switching apparatus having a plurality of poles and a housing, the housing including a cover member having a plurality of apertures; and
   a pin assembly comprising a plurality of pins structured to extend through said apertures and said thru holes to secure said electrical switching apparatus to said enclosure.

2. The electrical switching apparatus assembly of claim 1 wherein said electrical switching apparatus is structured to move between a connected position corresponding to said electrical switching apparatus being disposed within a corresponding one of said compartments with said poles being electrically connected to said electrical bus members, and a disconnected position corresponding to said poles being electrically disconnected and spaced from said electrical bus members; and wherein, when said electrical switching apparatus is disposed in said connected position, each of said apertures of said cover member is structured to align with a corresponding one of said thru holes of said gas barrier in order to receive a corresponding one of said pins.

3. The electrical switching apparatus assembly of claim 2 wherein each of said compartments further includes a first end, a second end disposed opposite and distal from the first end, a first sidewall, a second sidewall disposed opposite the first sidewall, an upper wall and a lower wall disposed opposite the upper wall; wherein said electrical bus members are disposed at or about the second end; wherein said gas barrier extends inwardly from at least one of said first sidewall, said second sidewall, said upper wall and said lower wall; wherein said gas barrier is disposed between the first end and the second end; and wherein, when said electrical switching apparatus is disposed in said connected position, said cover member is structured to at least partially overlay said gas barrier.

4. The electrical switching apparatus assembly of claim 3 wherein said gas barrier includes a first side and said second side disposed opposite the first side; wherein the first side faces the first end; wherein the second side faces the second end; wherein, when said electrical switching apparatus is disposed in said connected position, said cover member is structured to be disposed on the first side of said gas barrier and the remainder of said electrical switching apparatus is structured to be substantially disposed on the second side of said gas barrier.

5. The electrical switching apparatus assembly of claim 3 wherein said gas barrier includes a first segment extending perpendicularly inwardly from said first sidewall, a second segment extending perpendicularly inwardly from said second sidewall opposite said first segment, and a third segment extending perpendicularly inwardly from said upper wall; wherein each of said first segment and said second segment extends between said upper wall and said lower wall; wherein said third segment extends between said first segment and said second segment; and wherein said cover member is structured to overlap at least a portion of said first segment, said second segment and said third segment.

6. The electrical switching apparatus assembly of claim 5 wherein said first segment includes a first plurality of thru holes; wherein said second segment includes a second plurality of thru holes; wherein said cover member includes a first edge portion having a first plurality of apertures and a second edge portion having a second plurality of apertures; wherein said pin assembly comprises a first plurality of pins and a second plurality of pins; wherein said first plurality of apertures aligns with said first plurality of thru holes to receive said first plurality of pins; and wherein said second plurality of apertures aligns with said second plurality of thru holes to receive said second plurality of pins.

7. The electrical switching apparatus assembly of claim 6 wherein each of said first segment and said second segment includes four thru holes; wherein each of said first edge portion and said second edge portion includes four apertures; wherein said first plurality of pins is four pins; and where said second plurality of pins is four pins.

8. The electrical switching apparatus assembly of claim 3 wherein each of said pins has a longitudinal axis; wherein each of said pins is structured to extend horizontally from said cover member toward the second end of the corresponding one of said compartments of said enclosure; and wherein the longitudinal axis of each of said pins is structured to be substantially parallel with respect to said first sidewall, said second sidewall, said upper wall and said lower wall.

9. The electrical switching apparatus assembly of claim 1 wherein each of said pins comprises an insertion end, an enlarged head, and an elongated body portion extending between said insertion end and said enlarged head.

10. The electrical switching apparatus assembly of claim 9 wherein said cover member has a first side and a second side disposed opposite the first side; wherein, when said electrical switching apparatus is disposed in said connected position, the second side is structured to engage and overlap a portion of said gas barrier; and wherein, when said pins are installed, said elongated body is structured to extend through a corresponding one of said apertures and a corresponding one of said thru holes, and said enlarged head is disposed on them first side of said cover member.

11. A switchgear system comprising:
an enclosure comprising a number of compartments and a gas barrier, said gas barrier having a plurality of thru holes;
a plurality of electrical bus members; and
an electrical switching apparatus assembly comprising:
an electrical switching apparatus having a plurality of poles and a housing, the housing including a cover member having a plurality of apertures, and
a pin assembly comprising a plurality of pins structured to extend through said apertures and said thru holes to secure said electrical switching apparatus to said enclosure.

12. The switchgear system of claim 11 wherein said electrical switching apparatus is structured to move between a connected position corresponding to said electrical switching apparatus being disposed within a corresponding one of said compartments with said poles being electrically connected to said electrical bus members, and a disconnected position corresponding to said poles being electrically disconnected and spaced from said electrical bus members; and wherein, when said electrical switching apparatus is disposed in said connected position, each of said apertures of said cover member is structured to align with a corresponding one of said thru holes of said gas barrier in order to receive a corresponding one of said pins.

13. The switchgear system of claim 12 wherein each of said compartments further includes a first end, a second end disposed opposite and distal from the first end, a first sidewall, a second sidewall disposed opposite the first sidewall, an upper wall and a lower wall disposed opposite the upper wall; wherein said electrical bus members are disposed at or about the second end; wherein said gas barrier extends inwardly from at least one of said first sidewall, said second sidewall, said upper wall and said lower wall; wherein said gas barrier is disposed between the first end and the second end; and wherein, when said electrical switching apparatus is disposed in said connected position, said cover member is structured to at least partially overlay said gas barrier.

14. The switchgear system of claim 13 wherein said gas barrier includes a first side and said second side disposed opposite the first side; wherein the first side faces the first end; wherein the second side faces the second end; wherein, when said electrical switching apparatus is disposed in said connected position, said cover member is structured to be disposed on the first side of said gas barrier and the remainder of said electrical switching apparatus is structured to be substantially disposed on the second side of said gas barrier.

15. The switchgear system of claim 13 wherein said gas barrier includes a first segment extending perpendicularly inwardly from said first sidewall, a second segment extending perpendicularly inwardly from said second sidewall opposite said first segment, and a third segment extending perpendicularly inwardly from said upper wall; wherein each of said first segment and said second segment extends between said upper wall and said lower wall; wherein said third segment extends between said first segment and said second segment; and wherein said cover member is structured to overlap at least a portion of said first segment, said second segment and said third segment.

16. The switchgear system of claim 15 wherein said first segment includes a first plurality of thru holes; wherein said second segment includes a second plurality of thru holes; wherein said cover member includes a first edge portion having a first plurality of apertures and a second edge portion having a second plurality of apertures; wherein said pin assembly comprises a first plurality of pins and a second plurality of pins; wherein said first plurality of apertures aligns with said first plurality of thru holes to receive said first plurality of pins; and wherein said second plurality of apertures aligns with said second plurality of thru holes to receive said second plurality of pins.

17. The switchgear system of claim 16 wherein each of said first segment and said second segment includes four thru holes; wherein each of said first edge portion and said second edge portion includes four apertures; wherein said first plurality of pins is four pins; and where said second plurality of pins is four pins.

18. The switchgear system of claim 13 wherein each of said pins has a longitudinal axis; wherein each of said pins is structured to extend horizontally from said cover member toward the second end of the corresponding one of said compartments of said enclosure; and wherein the longitudinal axis of each of said pins is structured to be substantially parallel with respect to said first sidewall, said second sidewall, said upper wall and said lower wall.

19. The switchgear system of claim 11 wherein each of said pins comprises an insertion end, an enlarged head, and an elongated body portion extending between said insertion end and said enlarged head.

20. The switchgear system of claim 19 wherein said cover member has a first side and a second side disposed opposite the first side; wherein, when said electrical switching apparatus is disposed in said connected position, the second side is structured to engage and overlap a portion of said gas barrier; and wherein, when said pins are installed, said elongated body is structured to extend through a corresponding one of said apertures and a corresponding one of said thru holes, and said enlarged head is disposed on them first side of said cover member.

* * * * *